United States Patent [19]
Adams, Jr.

[11] 3,917,354
[45] Nov. 4, 1975

[54] CONTAINERIZED HANDLING OF FLOWABLE SOLIDS

[75] Inventor: Russell J. Adams, Jr., Lansdale, Pa.

[73] Assignee: Matlack, Inc., Lansdowne, Pa.

[22] Filed: Nov. 6, 1970

[21] Appl. No.: 87,415

[52] U.S. Cl. ............... 302/52; 214/310; 214/318; 222/166; 222/195; 222/143
[51] Int. Cl. ...................... B65g 53/40; B65g 53/38
[58] Field of Search ............ 214/318; 222/164, 166, 222/143, 185, 195; 302/52; 298/7

[56] References Cited
UNITED STATES PATENTS

| | | | |
|---|---|---|---|
| 14,301 | 2/1856 | Bell | 298/7 |
| 1,354,817 | 10/1920 | Fragner | 298/7 |
| 1,725,622 | 8/1929 | Dematteis | 222/166 |
| 1,935,057 | 11/1933 | Natali | 105/243 |
| 2,930,512 | 3/1960 | Paton | 222/195 |
| 2,968,425 | 1/1961 | Paton | 222/195 |
| 3,069,208 | 12/1962 | Green et al. | 302/52 |
| 3,083,879 | 4/1963 | Coleman | 222/143 |
| 3,202,461 | 8/1965 | Paton | 302/52 |
| 3,241,725 | 3/1966 | Carmichael | 222/164 X |
| 3,306,675 | 2/1967 | Fritz | 302/52 |

Primary Examiner—Evon C. Blunk
Assistant Examiner—W. Scott Carson
Attorney, Agent, or Firm—John J. McAleese, Jr.

[57] ABSTRACT

A container for dry bulk flowable commodities is provided having means for pressure or gravity loading and for vacuum discharge. The container is transportable on conventional truck trailer equipment as well as by ship or railroad flat car.

2 Claims, 8 Drawing Figures

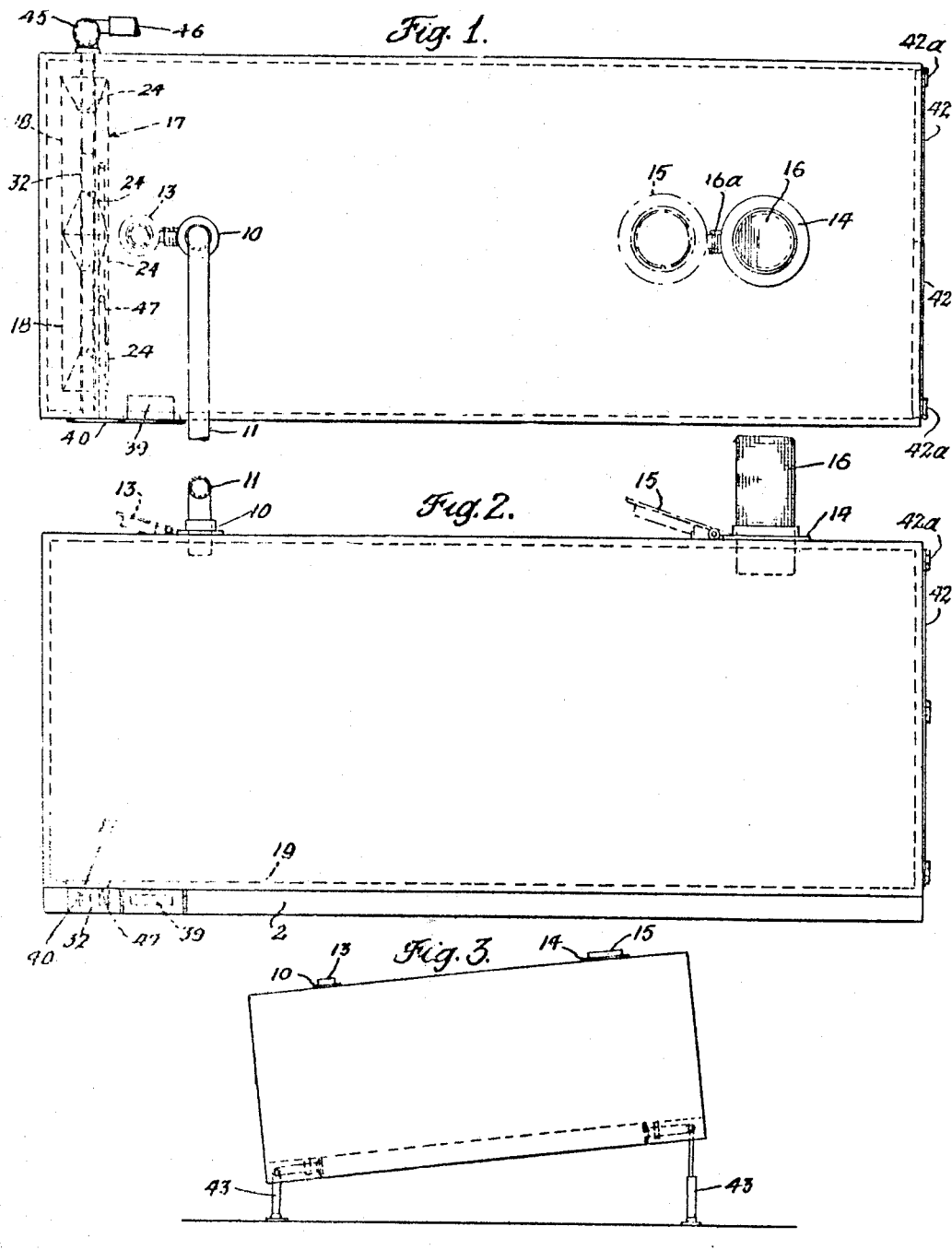

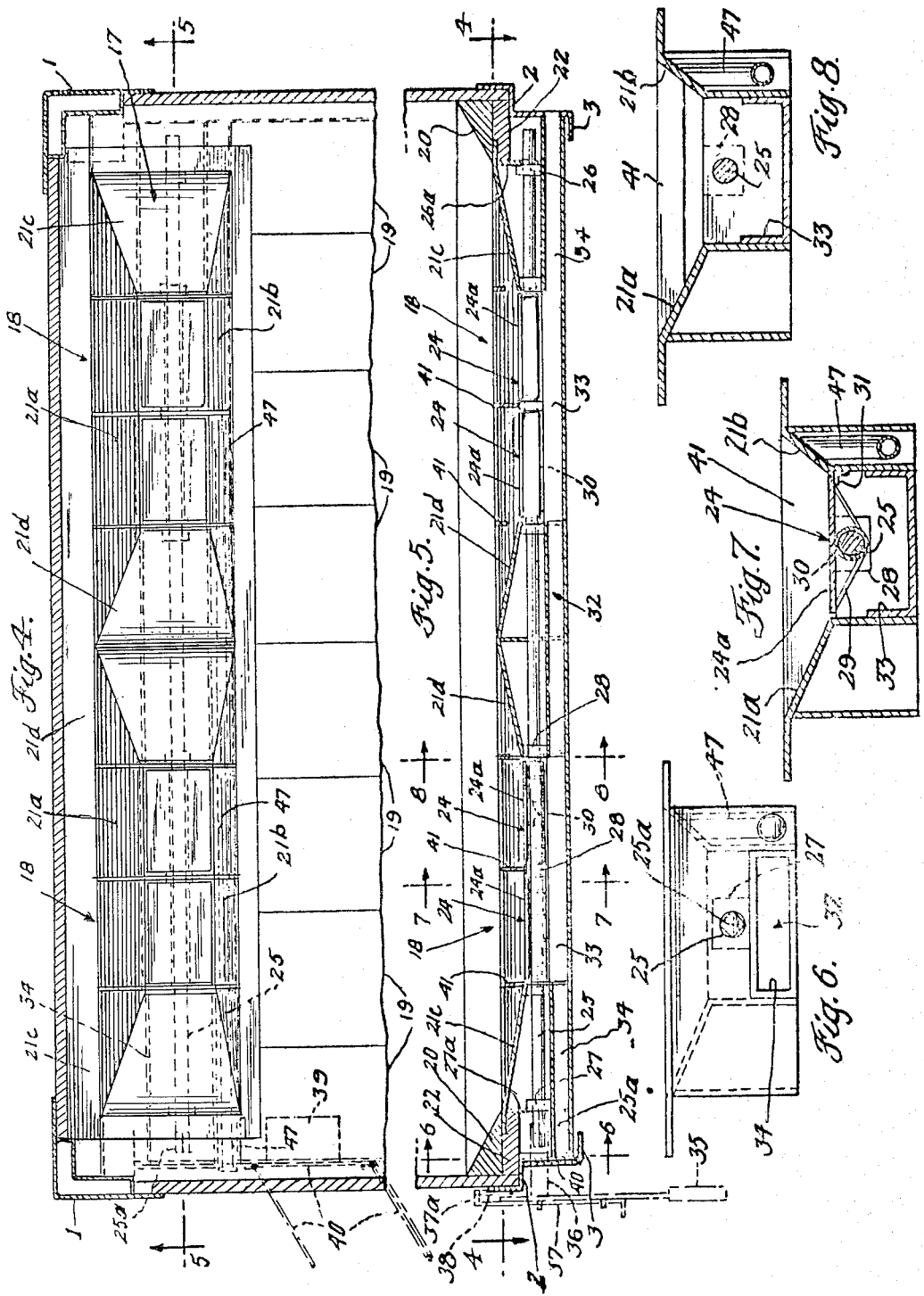

CONTAINERIZED HANDLING OF FLOWABLE SOLIDS

BACKGROUND OF THE INVENTION

1. Field of the Invention

This invention relates to the containerization of cargo for shipment and storage and is especially directed to the provision of standard-sized containers adapted for the transportation of dry bulk flowable commodities.

2. Description of the Problem and the Prior Art

Prior methods and equipment used in the transportation of dry bulk flowable commodities have resulted in high shipment costs and also in the risk of contamination of the product being shipped. The problem of contamination is particularly acute in the handling of plastic powders and pellets of the kind formed into products such as plastic films intended for wrapping food or used for coatings for cans and food packages and is also serious for other products intended for use where absolute sterility or freedom from contamination is required. In many such cases, substantially one hundred per cent purity is required.

As can be imagined, handling of the plastic pellets or powders in bulk form during loading for shipment and unloading creates a significant opportunity for contamination. Although the use of packages such as lined drums or small boxes is commonly resorted to, the haulage of large quantities in this way is costly for the shipper and for the customer, as loading and unloading costs are fairly high and adequate storage areas, equipment and facilities for packaging material and for packing the commodity must be provided. Frequently, as where the customer is processing large quantities of the commodity, the use of drums or similar packages is simply not economically feasible.

Of the various methods of bulk shipment of dry flowable commodities in quantity, perhaps the best approach has been the use of tank trucks of the kind ordinarily intended for hauling liquids in bulk.

Of the other efforts of which I am aware, some have been directed to the provision of specially designed trailers but these are so specialized that they are generally not suitable for the handling of any material other than the one they were originally intended to handle. This means that the trailer is more often than not returned to the original terminal empty and the revenue which the trucker would ordinarily get by backhauling a load is lost. When tank trucks, tank trailers or other specialized trailers are used, the investment which the hauler has in a piece of equipment with expensive running gear is so high that once it is delivered to its ultimate destination, it is impractical to leave it for use as a storage container. Thus, the product must be unloaded as soon as possible after arrival and as a consequence of the additional handling during unloading, some contamination is inevitable. Moreover, cost and design considerations make it expensive to ship such a trailer by ship or train when it might otherwise be desirable to do so. As a result, the commodity being shipped is usually reloaded when sea or rail transportation is necessary and may be handled several times during a lengthy shipment abroad.

SUMMARY OF THE INVENTION

The present invention provides a standard-sized container for bulk flowables which is adapted to be carried with equal facility on highway trucks, trailers, railroad flat cars or on the decks of ships suited for the carrying of containerized cargo. The container is provided with means for gravity or pressure loading and with special equipment for vacuum or gravity discharge in such manner that the contents can be kept contamination free. A special advantage of the invention is that there need be no handling of the contents of the container from the time of loading at the original shipment point until such time as the contents are actually used. Thus, a major source of contamination of the product being shipped can be avoided.

Containers formed according to the invention are of special advantage for overseas shipments, or other occasions where one leg of a journey may be by truck, and another by ship, or by rail. The containers are specially dimensioned so that they can be loaded in closely abutting side-by-side or end-to-end relationship thus maximizing the amount of product which can be shipped via any of these modes of transportation and minimizing handling time and costs.

Among the advantages which the invention gives to the shipper is that the container can be readily loaded onto a truck, and unloaded at the point of destination where it can serve as a storage bin or silo for the product. The invention contemplates the use of a large number of such containers so that the shipper can pick up other containers of the same design near the point of discharge of his initial load and return these loaded to the freight terminal from which he originally came. Since the containers are designed so that they can carry bulk flowable dry solids, liquids or pieces of freight, the hauler will rarely need to return to the originating terminal without a full load.

The inside walls of the container are preferably lined with an inert coating material so that the container can be easily cleaned. In this way, a material such as polyethylene pellets can be carried on one trip and a material such as dry catalyst carried on another trip without risk of cross-contamination and with minimal time lost in cleaning the container before re-use.

By way of summarization of the foregoing, important objects of my invention are:

The provision of equipment and techniques for handling dry bulk, flowable solids which substantially eliminate the risk of contamination of the product.

The provision of a multi-purpose container suitable for the handling of dry bulk, flowable solids, liquids or ordinary freight.

The provision of standardized container modules of a size suitable for loading on standard-sized truck-trailers as well as other types of carriers.

The provision of a container free of expensive running gear, which container can be transported by truck, train or ship.

The provision of a container having means for vacuum or gravity discharge of the contents.

The provision of a container having pressure or gravity loading equipment.

DESCRIPTION OF THE DRAWINGS

In the detailed description of an illustrative embodiment of the invention which follows hereinafter, reference is made to the following figures in the drawings:

FIG. 1 is a plan view of a container formed in accordance with the teachings of the present invention;

FIG. 2 is an elevational view of the container shown in FIG. 1;

FIG. 3 is an elevational view on a reduced scale with respect to FIGS. 1 and 2, showing the container as it is intended to be used for the storage of dry bulk flowables;

FIG. 4 is a plan section of the floor of one end of the container shown in FIGS. 1 through 3;

FIG. 5 is a view, in section, taken along line 5—5 of FIG. 4;

FIG. 6 is a sectional view taken along the line 6—6 of FIG. 5;

FIG. 7 is a sectional view taken along line 7—7 of FIG. 5;

FIG. 8 is a sectional view taken along line 8—8 of FIG. 5.

DESCRIPTION OF ILLUSTRATIVE EMBODIMENT

Turning now to a detailed description of the illustrative embodiment, FIGS. 1 and 2 show a container formed in accordance with the teachings of the invention. The container shown in FIGS. 1 and 2 is of rectangular shape and of standardized size and dimension so that it will fit the bed of a highway truck trailer and can be carried on a railroad flat car or can be carried on the deck of a ship suitable for carrying containerized cargo. Preferably, the container is about 8' wide and 8½' high and either 20' or 40' in length. When so standardized, one or two containers can be readily carried by a highway truck trailer without overhang and containers so dimensioned are also suitable for shipment as a part of a containerized cargo on board a ship or for shipment on conventional railroad flat cars.

Preferably, the container is substantially free of exterior projections, the portions of the container projecting outwardly shown in FIGS. 1 and 2 being removable as will be explained presently. The absence of exterior projections makes it possible to store and transport the containers with one abutting another or in stacks and also facilitates handling all them by conventional fork lift equipment. The sides and top of the container are typically constructed of plywood with angle shaped metal reinforcement strips 1 running along and covering the top and side edges. Angled strips 2, the lower portions of which project downwardly and then inwardly, as shown at 3 in FIG. 5, reinforce the lower edges and also support the container with the floor raised somewhat above ground level. The surfaces 3 act as support rails upon which the container can slide as it is positioned on a trailer bed or other surface. The support rails also facilitate the unloading of the container of a truck or trailer of the kind equipped with a tiltable bed, as the container will readily slide off when the bed is tilted.

As best shown in FIGS. 1 and 2, the top of the container is provided with an inlet coupling member 10 which is adapted to be connected to a hose 11 through which the container can be filled with a dry bulk flowable material. Coupling member 10 is preferably provided with a coupling portion which cooperates with a snap-type fitting on the end of the hose 11 so that an air-tight connection can be made. The fitting 10 is also provided with a hinged cover or closure 13 which seals the opening once the container is filled.

For loading the container under pressure, a vent 14 is also provided in order to allow the escape of excess air. Vent 14 has a cover 15 hinged at 16a and a removable filter element 16 which fits tightly within the confines of the vent opening when the container is being loaded. Filter or screen element 16 may be of the woven wire-mesh type, although other filter materials such as fiberglass or a porous paper filter media may be employed.

During the loading of the container under pressure, it can be seen that a slight positive pressure will be maintained inside the container, as the only escape path for air within the container is through the filter element 16.

Located in the floor and preferably at one end thereof, a discharge means shown in broken lines in FIG. 1 and identified generally by the reference character 17 is provided for the discharge of the contents of the container. Discharge means 17 is shown in detail on an enlarged scale with respect to the other views in FIGS. 4 through 8 and in the illustrative embodiment of the invention, comprises a pair of identical hoppers 18. Hoppers 18 are mounted slightly below the level the floor of the container, the floor surface being comprised of planks designated by the number 19. Chamfer strips 20 lead down from the floor and from the walls of the container to the level of the hoppers as can be seen in FIGS. 4 and 5.

The hopper structure is formed of stainless steel or other suitable sheet metal, each hopper consisting of downwardly and inwardly bent plates 21a, 21b, 21c and 21d which are welded together and which have horizontally extending edge sections secured in place between wood strips 22 and the chamfer strips 20. Plates 21a–21d are also provided with portions which extend downwardly from the inclined portions, the vertical portions forming a short conduit or passageway which leads to a horizontally extending discharge tube described presently.

In the illustrative embodiment of the invention, four gates, generally indicated at 24, control the flow of materials from the hoppers. The gates are mounted on a shaft 25 extending from one side to the other of the entire hopper structure. Shaft 25 is journaled at one end in a bearing 26 on a vertically extending plate 26a and at the other end in a bearing 27 mounted on a plate 27a. Intermediate shaft bearings 28 are also provided in order to provide adequate support for the shaft.

The structure of the gates is perhaps best shown in FIG. 7. Each gate comprises a flat plate or door 24a and in the position shown in FIG. 7 each fills one of the four conduits leading down from the inclined portions of the hoppers. Each gate also comprises a vee-shaped support plate 29 which is mounted on the support shaft and which supports the flat plates 24a. Pins 30, shown in FIG. 5, secure the plates 24a and the vee-shaped support plates on the shaft.

Gates 24 are thus secured to the shaft, and by rotation of the shaft in the counter-clockwise direction as viewed in FIG. 7, the gates are opened allowing for the flow of material downwardly. Conversely, rotation of the shaft in the clockwise direction brings the gates to the horizontal position shown to block the flow of material. Preferably, an angle stop 3 is provided in order to limit the movement of the gate in the clockwise direction to the position in which the gates seal the opening.

The material discharges from the hoppers into a discharge tube 32 which extends from one side to the other of the container and is conveniently formed as follows. U-shaped channels 33 are positioned beneath the gates 24 with their legs extending upwardly and being welded or otherwise secured to vertically extending portions of plates 21a and 21b. Rectangular tubes 34 are secured to the ends of these channels 33 so as to form a unitary tubular structure with intermediate upwardly facing openings beneath the hopper gates.

Preferably, movement of the gate is controlled by a detachable handle shown in broken lines at 35 in FIG. 5. Handle 35 has a socket portion 36 projecting at right angles thereto. The socket portion has a square-shaped recess adapted to fit the squared-off end of the shaft 25, the end being best shown at 25a in FIG. 6.

The handle may be provided with a spring loaded finger 37. The end of the finger extends laterally as can be seen at 37a and is adapted under spring pressure to fit within any one of a series of notches (not shown) in a stop bracket 38. The finger 37 thus locks the gate in any adjusted position, yet is readily releasable by the operator merely by pressing the finger in the direction which causes compression of the spring.

If desired, a storage compartment may be provided for the handle 35 when it is not in use. In the illustrative embodiment, such a compartment is provided adjacent the discharge structure and is indicated in broken lines and identified by the reference character 39. A double hinged door 40 is provided for the handle storage compartment and the end of the discharge tube. As shown in FIG. 4 in broken lines, when one panel of the door is opened, the discharge tube is exposed and when both panels are opened, the handle storage is also exposed.

In order to protect the gates against damage, as for example when the container is used for hauling freight, grate bars 41 span each of the hoppers 18. The bars 41 are welded or otherwise secured to the sidewalls of the hoppers.

As indicated above, the container is also intended for hauling freight and for this purpose large doors 42 hinged at 42a are provided at one end.

When the container is removed from its trailer and is ready to be unloaded, it is desirable to tilt it towards the discharge end and for this purpose, I provide adjustable jacks 43. The jacks, best shown in FIG. 3, are preferably attached to the bottom corners of the container by dogs of conventional design.

According to the invention, the discharge end of tube 32 is provided wtih a suitable fitting 45 shown in FIG. 1. Fitting 45 may be detachable and provides an airtight connection between the discharge tube and a hose 46 connected to a suitable vacuum source for vacuum unloading of the contents. Preferably, a tube 47 leads into the container from a point just adjacent the discharge tube 32, for the purpose of aerating the contents, thereby improving flowability. Tubing 47 leads upwardly to a pair of ports 47a in the inclined walls of the hoppers. These ports are normally sealed but can be opened when a load requiring aeration is to be carried. Preferably a porous hose, not shown, is connected to the ports. The hose provides uniform aeration through a large part of the contents, thus greatly improving flowability.

Preferably, the interior of the container is lined with a seamless non-porous inert coating material which fills all cracks and crevices in the wooden parts so that particles of a dry bulk material cannot be lodged there so as to present a hazard of contamination to the next load. If the container is also to be used for the carrying of liquids, the gates 24 should be made fluid tight.

From the foregoing, it should be evident that the invention provides a container which is uniquely suited for the handling of dry bulk flowable solids as well as for other materials. In use, container can be filled under pressure and for this purpose cover 13 is opened to expose coupling 10 with which the hose used to fill the container is connected. Cover 15 is also opened and filter 16 is placed in the opening. When the container is filled, the two openings above-mentioned are covered and sealed and the container loaded on the bed of a truck or other carrier. At the delivery point, the container is removed from the truck where it may be stored until the contents are needed. A vacuum hose may then be attached to the end of the discharge tube 32 and as in the case of a plastic material used for the production of extrusions, the material may be conveyed directly through the vacuum hose to the extruder for processing. In the meantime, the trucker can use empty containers picked up at the discharge point for hauling other bulk flowable commodities or pieces of freight which can be loaded through the access doors 42.

The invention makes feasible economies in operation not heretofore achieved in the handling of dry bulk flowable materials. Furthermore, it can be seen that the possibilities for contamination are drastically reduced and that freedom from contamination is largely a matter which is under the control of the user who no longer has to worry about impairment of the quality of the material during shipment.

By providing containers of various sizes or by providing partitions which can be inserted in containers such as the one disclosed, relatively small-sized shipments could be handled with the customer still getting the advantages mentioned above. Obviously, when a container is so partitioned it may be desirable to provide additional discharge means, and the provision of such additional discharge means is to be considered to be within the scope of this invention.

I claim:

1. A substantially retangular bulk cargo container adapted to be transported on the bed of a truck or other carrier, said container having flat side, end, bottom and top wall panels, said panels being joined together in a rectangular configuration with the panels being substantially free of exterior side and end projections and having substantially air tight seams, said container having an inlet coupling adapted to be connected to a hose for filling the container with dry bulk flowable material, a vent means in the container including a filter and a removable cover, said vent means providing a restricted air flow passage for the escape of air during loading of the container and for maintaining a slight positive pressure with respect to the outside of the container, thereby maintaining the contents in an uncontaminated state until use, discharge means at the bottom of the container comprising a hopper structure located at one end of the container, said hopper structure including inclined wall portions and gate means comprising a rotatable gate valve adapted to close the hopper in one position and being adjustably locked in a plurality of angularly spaced apart positions whereby the flow of material discharged is adjustably controlled, means for tilting the container toward the end having the hopper, and support rails on the bottom walls of the container for sliding the container on a trailer bed or other support surface.

2. A substantially rectangular bulk cargo container adapted to be transported on a bed of a truck or other carrier, said container being a standard sized unit having side, top, bottom and end walls joined together by substantially air tight seams and substantially free of exterior projections so that the container can be stacked or loaded in abutting side-by-side or end-to-end relationship with other containers and further being dimensioned so that the container or multiples thereof fit the bed of the carrier either singly or in side-by-side or end-to-end relationship, said container having a fill opening adapted to receive a hose for filling the container with dry bulk commodity under pressure, a discharge opening in the floor of the container near one end thereof with a discharge conduit extending from the opening to a side wall of the container for vacuum un-loading of the contents, said discharge opening comprising a hopper structure including inclined wall portions and means comprising a rotatable gate valve adapted to close the hopper in one position and being adjustably locked in a plurality of angularly spaced apart positions whereby the flow of material is adjustably controlled, vents in the container including a filter and restricted air passages to provide for venting of the interior when loading or unloading while maintaining a slight positive pressure with respect to the exterior of the container; closures for the vents for maintaining the interior sealed when the container is loaded, support rails on the bottom of the container including flanges projecting downwardly from the bottom of the container, said rails projecting inwardly from the bottom surfaces of the flanges, jacks for tiltably mounting the container and for raising the end of the container opposite the discharge opening whereby discharge of the contents is facilitated, pivotally mounting means connecting said jacks to the bottom of the container inward of the rails for pivoting said jacks from a retracted position in which they are above the surface of the rails and an operative position in which they support the container, and an enlarged sealable access door to permit loading of non-bulk freight when the container is not used for bulk commodities.

\* \* \* \* \*